United States Patent [19]

Fleischer et al.

[11] 3,902,048

[45] Aug. 26, 1975

[54] OMNIDIRECTIONAL OPTOMECHANICAL SCANNING APPARATUS

[75] Inventors: John Martin Fleischer, San Jose; David Harwood McMurtry, Portola Valley, both of Calif.

[73] Assignee: International Business Machines Corporation, Armonk, N.Y.

[22] Filed: July 11, 1974

[21] Appl. No.: 487,473

[52] U.S. Cl. ... 235/61.11 E; 250/555; 340/146.3 F; 340/146.3 Z

[51] Int. Cl. ........................... G06k 7/10; G08c 9/06

[58] Field of Search ...... 235/61.11 E; 250/555, 566; 340/146.3 F, 146.3 H, 146.3 Z

[56] References Cited

UNITED STATES PATENTS 3,818,444 6/1974 Connell ........................ 340/146.3 F

*Primary Examiner*—Daryl W. Cook

*Attorney, Agent, or Firm*—George E. Roush

[57] ABSTRACT

An omnidirectional optomechanical system is arranged for scanning bar coded labels passing a rectangular scanning window with a plurality of interlaced scans in a plurality of differing directions whereby the labels are completely scanned irrespective of orientation. The interlaced and plural directive scanning rays are generated by directing a beam of light, from a laser or like light source, onto a rotating multi-faceted mirror for deflecting the light beam into a mirror tunnel which is positioned at a predetermined angle at which there is further deflection of the light beam within the mirror tunnel in a number of laterally displaced and crossed scanning segments as appearing at the scanning window located at the end of the tunnel. Alternately, the mirror tunnel and the rotating mirror serve in the sensing of the label under uniform overall illumination.

14 Claims, 12 Drawing Figures

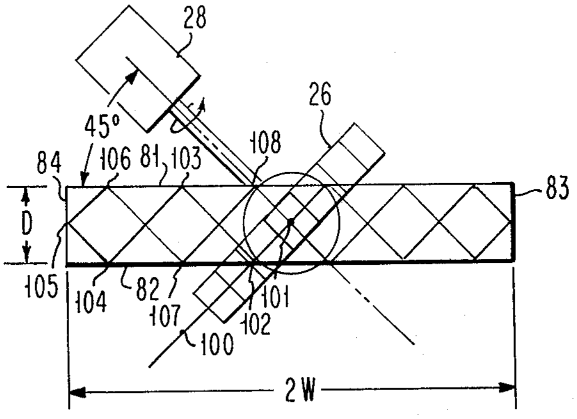
FIG.4C
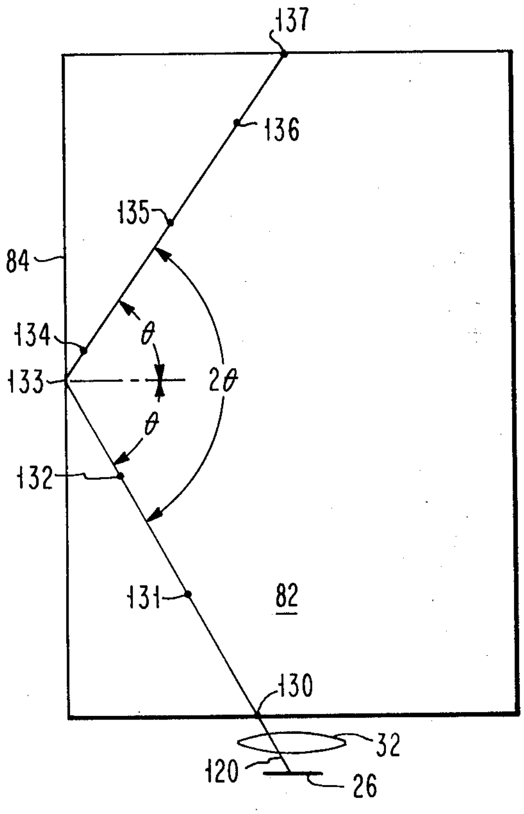
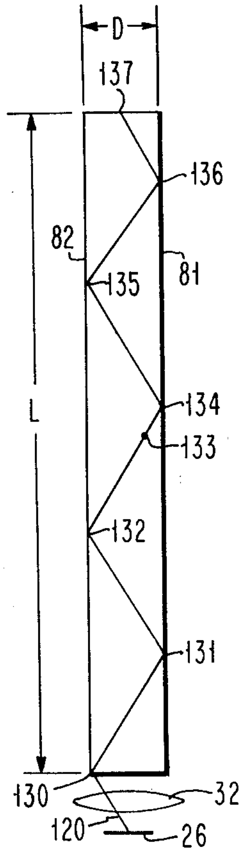
FIG.4A FIG.4B

OMNIDIRECTIONAL OPTOMECHANICAL SCANNING APPARATUS

The invention disclosed herein is related to that disclosed in the copending U.S. Pat. application Ser. No. 382,783 of Arlen J. Bowen et al. filed on the 26th day of July 1973 for "An Omnidirectional Optical Scanner" and in the copending U.S. Pat. application Ser. No. 484,479 of Melbourne Edward Rabedeau filed on the 1st day of July 1974 for "Omnidirectional Optical Scanning Apparatus".

The invention relates to optical scanning systems and more particularly to omnidirectional optical scanning systems.

The invention finds particular application for scanning randomly-oriented bar coded labels, which, for example, are attached to consumer items being checked out at a counter. The check-out clerk, or checker, merely passes the item across the scan window insuring that the label is within the scanning window as the item is being placed into a box or bag. Except for some relatively small items, little attention need be paid to the orientation of the items as they are moved across the scanning window.

Omnidirectional scanning systems have been suggested as particularly suitable for scanning systems where the checker passes the items across a scanning window. The prior art also discloses optical systems and components which those skilled in the art will consider in the design and development of a point-of-sale item scanning system.

The more pertinent arrangements in the prior art are to be found in the following U.S. patents:

| | | | |
|---|---|---|---|
| 2,887,935 | 05/1959 | Scott et al | 095/4.5 |
| 3,169,186 | 02/1965 | Howard | 350/7 |
| 3,237,162 | 02/1966 | Goetz | 340/146.3 |
| 3,414,731 | 12/1968 | Sperry | 250/219 |
| 3,450,890 | 06/1969 | Skorup | 250/227 |
| 3,456,997 | 07/1969 | Stites et al | 350/7 |
| 3,718,761 | 02/1973 | Meyer | 178/7.6 |
| 3,728,677 | 04/1973 | Munson | 340/146.3F |

The patents to Scott et al. and to Goetz show mirror tunnels in use, but not arranged as in the invention. The patents to Howard and to Skorup show structures for reading documents that have some teaching for those skilled in the art, but do not show the arrangement of the invention.

The patent to Sperry is directed to circular labels which are readable without directional orientation; the arrangements shown are for centering the label before the scanning is begun. The patent to Stites is directed to arrangements for accommodating skew, which is a relatively slight misalignment in orientation, and the arrangements are not readily applicable to the solution of the problem with which the invention is concerned.

The patents to Meyer and Munson are more pertinent, but they are directed to systems limited to a square scanning window rather than a narrow rectangular scanning window of the invention. The square scanning window for a given width requires a greater reach on the part of the checker and is not as desirable from a human factors point of view as is a narrow rectangular scanning window. The narrow rectangular scanning window, however, does require multiple trace scanning patterns for insuring that the coded label will be properly scanned. The desired light patterns according to the invention are generated by relatively simple and inexpensive optical apparatus.

The objects of the invention indirectly expressed hereinbefore and those that will appear as the specification progresses are attained in an optomechanical system having an intense, substantially non-divergent light source such as a laser and with a rotating mirror deflecting a beam of light from that source through a tunnel mirror, preferably made of four plane mirrors, to a rectangular scanning window. The rotating mirror is arranged with respect to the mirror tunnel so that the beams are reflected by the walls of the mirror tunnel to trace out an overlapping and crossing pattern at the window.

In order that all the advantageous aspects of the invention obtain in practice, a specific embodiment, given by way of example only, is described in the remainder of this text with reference to the accompanying drawing, also forming a part of the specification, and in which.

Figure 5:
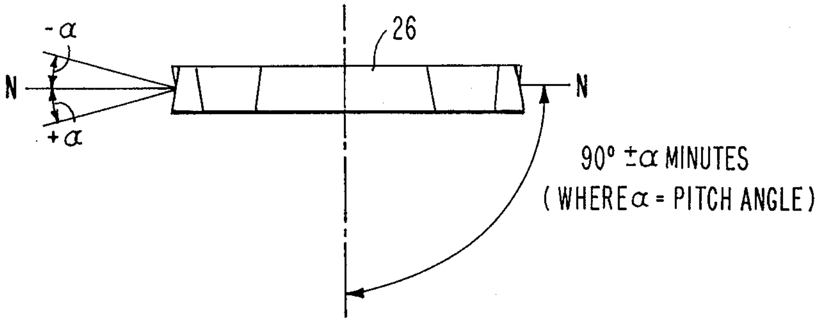
Figure 6:
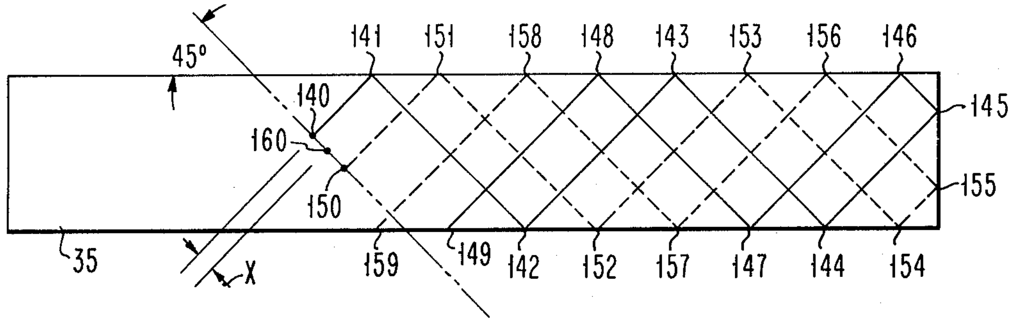
Figure 7:
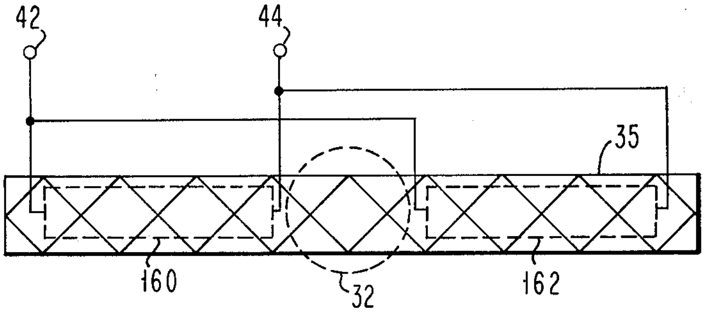
Figure 10:
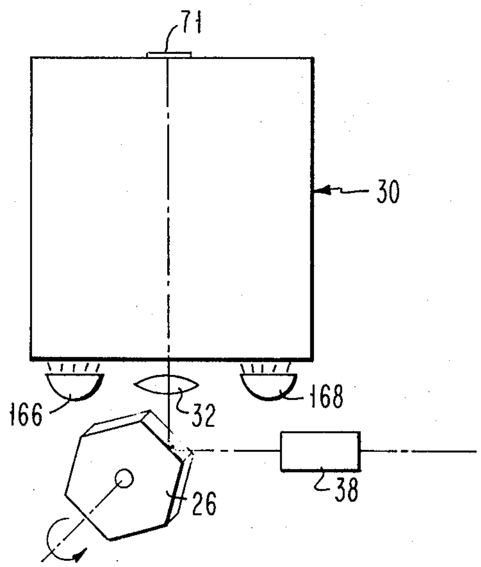
Figure 9:
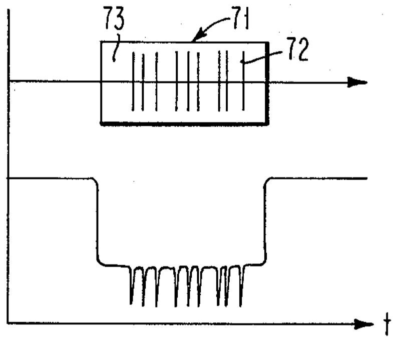
Figure 8:
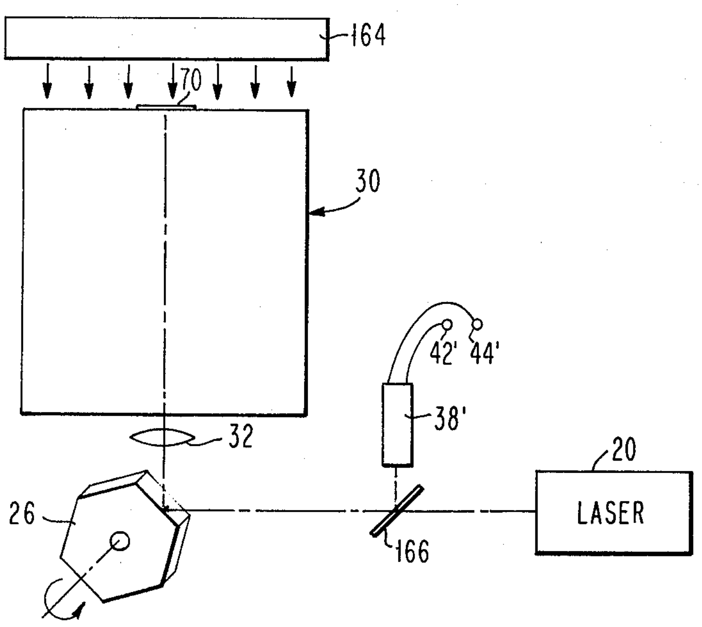

FIGS. 4*a*, 4*b* and 4*c* are schematic diagrams illustrating the layout of a tunnel mirror for omnidirectional scanning;

FIG. 5 is a schematic diagram illustrating a rotating mirror according to the invention;

FIG. 6 is a diagram illustrating the complete scanning pattern;

FIG. 7 is a diagram showing the placement of optical sensing apparatus according to the invention;

FIG. 8 is another diagram showing the optomechanical system according to the invention;

FIG. 9 is a diagram illustrating electric wave forms obtained with apparatus according to the invention; and FIG. 10 is another diagram of a mirror tunnel arrangement according to the invention.

Figure 1:
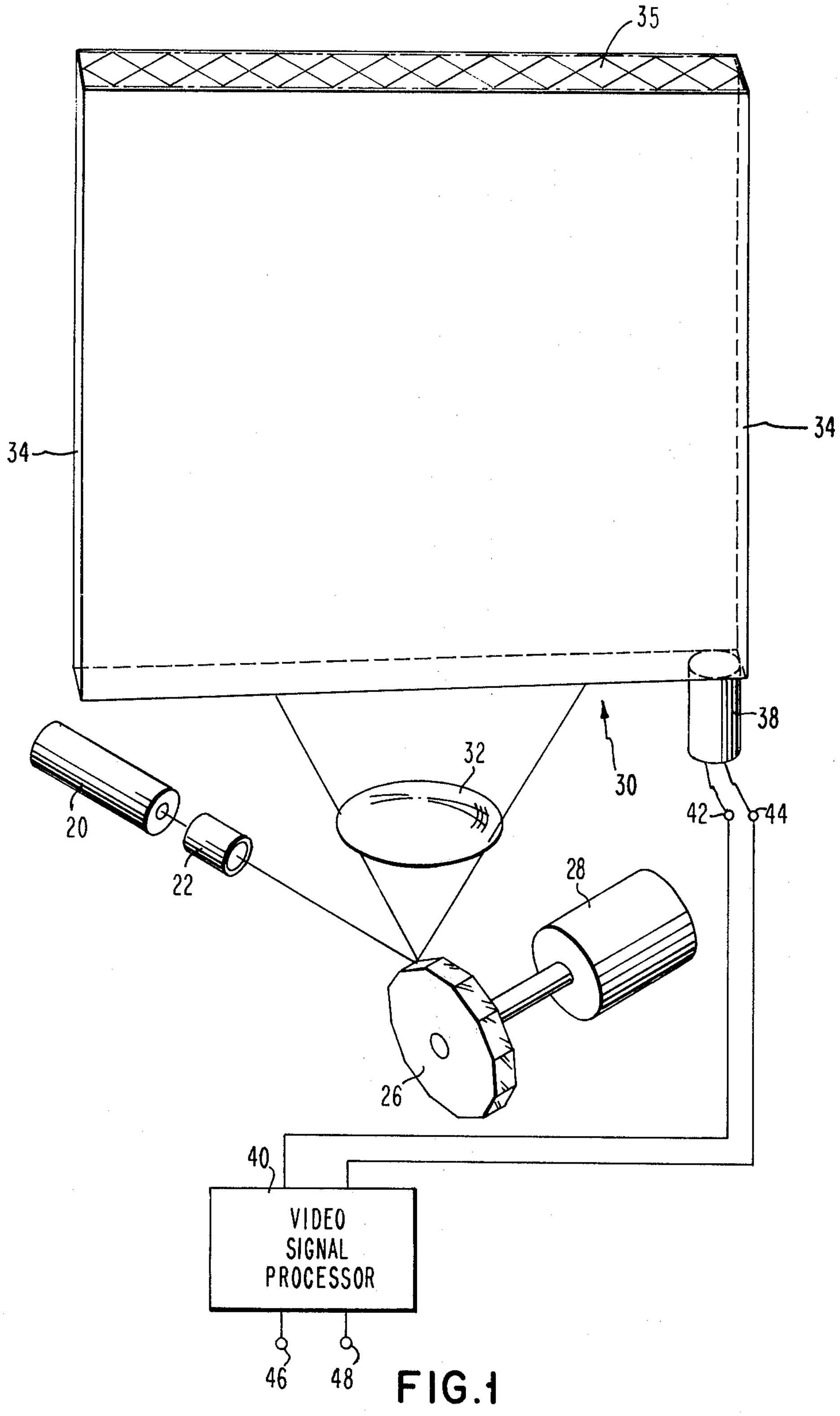
FIG. 1 is a schematic diagram of omnidirectional optomechanical scanning apparatus according to the invention.

A schematic overall view of an optical scanning system according to the invention is given in FIG. 1. A laser 20 is employed as a light source for generating an intense narrow beam of light. This beam of light is directed through an optical device 22 in the form of a lens for expanding the laser beam onto a multifaceted rotating mirror 26 driven by an electric motor 28. The beam swept out by the rotating mirror 26 is directed by a lens 32 into a tunnel mirror assembly 30. As reflected by the mirrors of the assembly 30, the segmented beams each produce a beam sweeping across the fan-shaped sector in the same direction substantially parallel to each other. The mirrors 34 are arranged to reflect the beam segments so that there will be scan segments at right angles to the first scan segment. Thus, a series of X-shaped or crossed scans will be produced in the aperture of a scanning window 35. A photoelectric device 38 is arranged at the end of the mirror tunnel remote from the window 35 to receive light reflected from the scanning window 35. The photosensitive device 38, which may be a photomultiplier tube and the like, is connected to video signal processing circuitry 40 at terminals 42, 44 for analyzing the electric signal to identify the information presented at the scanning window 35. An output electric signal is delivered at output terminals 46, 48 for application to the utilization circuitry. Alternate sensing arrangements will be described hereinafter.

Figure 2:
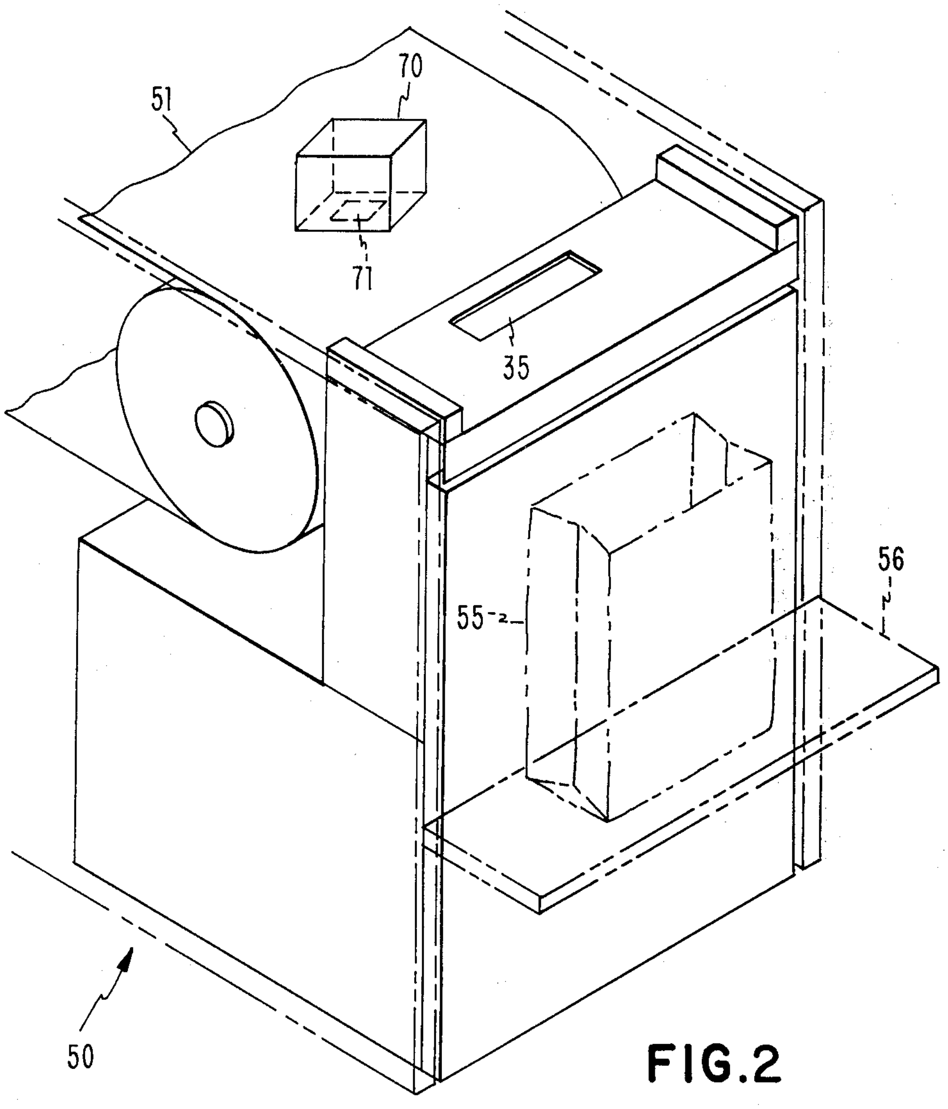
FIG. 2 is a perspective view illustrating a setting for the omnidirectional scanning apparatus of the invention.

A setting for the invention is shown in FIG. 2. The scanning window 35 is located at the top of an enclosure 50 forming a market checkout stand housing the previously described components. The scanning window 35 is a narrow rectangular aperture ideally about 2.5 by 25 centimeters, formed in the housing 50 and covered by glass or other suitable material transparent to the light generated by the laser 20.

An item of merchandise 70 bearing a bar coded label 71 is transported by a conveyor belt 51 to the scanning area. The checkout clerk passes the item 70 with the label 71 face down over the scanning window 35 just prior to placing the item 70 into a paper bag 55 which is supported on a shelf 56.

Figure 3:
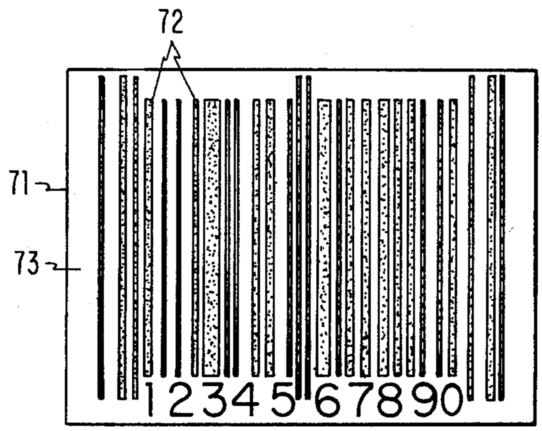
FIG. 3 depicts a typical label for which the omnidirectional scanning apparatus of the invention is arranged.

The label 71 is a bar coded label of the type shown in FIG. 3. The label 71 is printed with a plurality of bars 72 which have a reflectance less than the background area 73. Thus, as the light beam scans across the label 71, it is modulated by the difference in reflectance between the background 73 and the printed ink bars 72. The modulated reflected light is collected by the photosensitive device 38 (FIG. 1) which delivers an electric signal to the video signal processing circuitry where it is analyzed to identify the information represented by the bars 72 on the label 71. The scanning pattern at the window 35 is arranged to interpret the bars of the label 71 so that the data will be recovered irrespective of the orientation of the label 71 to the scanning window 35.

In one practical assembly, the scanning window is made 2.54 by 20.3 centimeters (8 by 1 inches). In general, the scanning beams should cross each other at the horizontal axis of the scanning window 35 and be substantially perpendicular to each other at the point of intersection.

In order to make the operation of the optomechanical scanning system according to the invention clear and to enable those skilled in the art to practice the invention, the optomechanical system will be described hereinafter in a step-by-step progression.

A schematic diagram of the manner in which the desired scanning pattern is made to appear in the scanning window 35 is shown in FIGS. 4*a*, 4*b* and 4*c*. The scanning lines were developed as follows. The light beam from the laser 20 is deflected by the rotating mirror 26 through the lens 32 that focuses the beam in the scanning area. FIG. 4*a* is an elevation view and FIG. 4*b* is a side elevation view of the interior of a four-mirror tunnel assembly. FIG. 4*c* is a plan view of the mirror tunnel looking down into the tunnel. The reflecting surfaces only of the mirrors are indicated, with the thickness of the glass or other supporting media omitted. The operation starting with a focused beam 100 at position 101, follows. The focus spot moves with increasing scan angle to the position 102 where it strikes the mirror 81. The mirror 81 reflects the beam downward as the scan angle continues to increase. The scan line is described from position 102 to position 103 on mirror 82. As the scan angle increases further, this process repeats itself going from position 104 to position 105 on mirror 83. At position 105 the beam 100 reverses direction and scans to 106. The net result of this process is the generation of crossed scans. As the scan angle increases still further, the focused spot traces the path between positions 106, 107 and 108; and at the extreme of the half field scan, the beam 100 is again at the position 101. The other half of the scan focus is derived by using the other half field of the spherical imaging lens 32.

The path of an extreme light ray operates at the maximum half field angle $\phi_m$. In FIG. 4*b* the ray 120 leaves the rotating mirror 26 and strikes the mirror 2 at point 130 and is reflected to position 131, while in FIG. 4*a* the ray travels in an apparent straight line. Similarly, the ray strikes position 132 and continues to position 133. The ray is reflected through an angle 2 $\theta$ in FIG. 4*a* and continues in a straight path on the side view to the point 134. Finally, the light ray arrives at position 137 which corresponds to position 101 retraced as shown in FIG. 4*c*. The beam has been reflected seven times. The imaging lens 32 can be positioned at the center of any of the crosses in FIG. 4*c*. Shifting to the left or right would require a larger lens half field angle on the one side than on the other. The tunnel length L required is a function of the tunnel width 2W, and the maximum operating half field angle $\phi_m$ is $L = 2W\sqrt{2}/\tan(\phi m)$.

The tunnel depth determines the spacing D of the cross scans and their number within a given tunnel. The number of crosses equals 2W/D.

The number of reflections will be (2W/D)+1 for an extreme ray. This is important since the intensity for the extreme ray will be reduced over that for position 101, $I_{Extreme} = I_0\ R^{(2W/D+1)}$, where $I_0$ is the intensity at position 101 and R is the mirror reflectance. A sample calculation illustrates the potential design parameters. For a tunnel window of dimensions 20.3 by 2.54 centimeters, the period for pattern repeat is approximately four milliseconds, and the focused spot is 25.4 by $10^{-3}$ centimeters in diameter.

For a lens half field angle maximum of 25° or 50° total sweep the total scan length required is calculated to be $2 \times \sqrt{2} \times 20.3$ or 57.45 centimeters, the length if all the crossed ends are unfolded. The focal length of the lens will be 60.96 centimeters. To permit tolerances for alignment and the like this focal length is 66 centimeters. The required tunnel length will be 66 centimeters minus the separation between the rotating mirror and the lens thickness which is assumed to be about 2.03 centimeters. Therefore, L will be equal to approximately 64 centimeters. With the lens 32 centered over the scanning window 35 (10.16 centimeters from the left to the right), there will be eight cross scans on 2.54 centimeter centers. The intensity of the extreme ray will be $I = I_0 \times R^9$, where R is the reflectivity assumed to be 0.98 of each reflection off the mirrors of the mirror tunnel assembly. Therefore the intensity will be 0.83 $I_0$. The extreme ray will be 17% lower in intensity than the one on axis. If $R = 0.95$, the variation will be 37%, which is still tolerable with alternating current detection schemes. To obtain a 0.0254 centimeter image at 6328 A., the beam diameter required at the rotating mirror 26 is 0.254 centimeters. A singlet lens designed specifically to keep geometric aberration to a minimum maintains uniform spot size.

A 12-facet mirror 26 with 30° facet angles produces a 60° scan per facet. The fly-back time for the 50° scan is $1 - 50/60 = 0.16$ or 16%.

In most practical applications it will be preferred to interlace scans produced as described above. For various facets of the rotating mirror 26 an incident beam will be deflected by the equation $D = F \tan 2 \infty$, where $\infty$ is the pitch angle with respect to the normal line N, as depicted in FIG. 5. For one facet tipped from the normal line N at an angle of $+\infty$ °, the scan path as shown in FIG. 6 is from position 140 to positions 141, 142 . . . 148, 149. With the next facet tipped at an angle of $-\infty$ ° from the normal line N, the scan path is beginning at position 150 to positions 151, 152, 153 . . . 158, 159. Thus, an interlaced scan is generated by two angled facets with one tipped at $+\infty$ ° and another at $-\infty$ °.

For the mirror tunnel hereinbefore described, an on-axis deflection between positions 160 and 140 or position 150 is produced by a pitch angle variation of 12.0 minutes. Facets with alternating pitch angles are readily produced in the batch fabrication of mirrors by the alignment setting of the fixture lap plane and the setting of the arbor axis.

An alternate concept for interlace scanning is disclosed in co-pending U.S. application Ser. No. 484,479. This involves plurality of beams striking the plane faceted, rotating mirror 26. Preferably, a beam splitter is used to produce beams at slightly varying angles which in effect achieve the same results as obtained with the rotating mirror 26 described above.

Using an alternating pitch angle mirror 26, the rotational rate is 2160 rpm or a four millisecond cross scan interlace pattern repeat. A sweep time of 1.0 microsecond is required to sweep a 0.0254 cm beam across a knife edge or the required electric wave band width is approximately three MHz. The beam sweep velocity is the order of 25,400 centimeters per second.

While an elongated scanning window has been described, it should be fully understood that the interlaced scanning according to the invention is equally adaptable to shorter scanning window arrangements including square windows having an aspect ratio of 1:1.

The light collection from the mirror tunnel assembly is extremely efficient because the detector collects light from the multiplicity of focal spots reflected in the tunnel walls. Collection of the light is restricted to the end of the tunnel remote from the scanning surface. As shown in FIG. 7, two solid-state, strip, photosensitive devices, 160 and 162 are employed in the sensing system.

Spurious light encountered in some applications of the invention may enter the optical system through overhead lamps or stray ambient light may pose a problem. A simple arrangement satisfactory for many applications comprises an optical notch filter with a notch at 63.28 A. located before the photosensitive device. One arrangement for overcoming the problem is shown in FIG. 8 wherein a floodlight source 164 is directed in the optical tunnel from above to create an artificial light bias. An alternate sensing arrangement is also illustrated here. The detector 38 is a high-gain Photo Multiplier Tube (PMT) which collects back reflection from the document 71 by way of the lens 32 and a half-silvered mirror 166 which is interposed between the rotating mirror 26 and the laser 20. The rotational axis of the mirror 26 is arranged at an angle of 45° with respect to the plane of the front and rear mirrors of the mirror tunnel 30.

The electronic circuits are designed to work at three light levels as shown in FIG. 9. Since the system is specifically designed to detect an intensely illuminated background behind the document 71, any spurious light must have sufficient intensity to overcome the artificial bias before the spurious highlevel signals result.

FIG. 10 shows an arrangement wherein the requirement for a laser is eliminated. Halogen light sources 166 and 168 located at the ends of the tunnel illuminate the document 71. Rotating mirror 26 scans the picture of the photomultiplier tube 38 across the document for bar code detection.

While the invention has been shown and described particularly with reference to preferred embodiments thereof, and various alternative structures have been suggested, it should be clearly understood that those skilled in the art may effect further changes without departing from the spirit of the invention as defined hereinafter.

The invention claimed is:

1. Omnidirectional optomechanical scanning apparatus for scanning bar coded labels, comprising a scanning window at which said labels are presented in random orientation, means for generating a beam of light, optical means optically coupled to said generating means for deflecting said beam of light in a line in a given plane, optical means interposed between said deflecting means and said scanning window for reflecting said deflected beam of light into scanning lines intersecting the plane of said scanning window at predetermined angles for producing a progression of crossed scans across said scanning window, photosensitive means, optical means interposed between said light beam generating means and said optical deflecting means for passing said beam onto said deflecting means and directing any light beam returning from said deflecting means onto said photosensitive means.

2. Omnidirectional optomechanical scanning apparatus as defined in claim 1 and wherein said reflecting optical means is constituted by a mirror tunnel.

3. Omnidirectional optomechanical scanning apparatus as defined in claim 2 and wherein said scanning window is a rectangle having an aspect ratio of the order of 1:8.

4. Omnidirectional optomechanical scanning apparatus for scanning bar coded labels comprising a scanning window at which said labels are presented in random orientation, a light source providing a beam of light, a multifaceted mirror arranged for continuous rotation, said light source and said rotating mirror being arranged with respect to said scanning window for deflecting said beam of light at said window, and a multiple of fixed mirrors arranged to form a mirror tunnel interposed between said multifaceted mirror and said scanning window for producing a multiple of crossed light beams scanning across said window.

5. Omnidirection optomechanical scanning apparatus as defined in claim 4 and incorporating a photo multiplier tube, and a half-silvered mirror interposed between said laser and said multifaceted mirror for passing said beam projected from said laser onto said rotating mirror and directing any light beam returning from said scanning window onto said photomultiplier tube.

6. Omnidirectional optomechanical scanning apparatus as defined in claim 4 and wherein said scanning window is rectangle having an aspect ratio of the order of 1:1.

7. Omnidirectional optomechanical scanning apparatus as defined in claim 6 and wherein said photoresponsive device is a photomultiplier tube.

8. Omnidirectional optomechanical scanning apparatus as defined in claim 4 and incorporating a photoresponsive device arranged for intercepting light from said scanning window as reflected by said label, and electric signal translating circuitry coupled to said photoresponsive device for producing an electric signal indicative of the information borne by said label.

9. Omnidirectional optomechanical scanning apparatus as defined in claim 4 and wherein said photoresponsive device comprises a solid state strip device arranged at the end of said tunnel mirror assembly remote from said scanning window.

10. Omnidirectional optomechanical scanning apparatus as defined in claim 9 and wherein said photomultiplier tube is arranged at one side of said mirror tunnel assembly at the end remote from said scanning window.

11. Omnidirectional optomechanical scanning apparatus as defined in claim 4 and wherein said multifaceted mirror is arranged with successive facets at an angle with respect to each other at which interlaced scanning is effected.

12. Omnidirectional optomechanical scanning apparatus as defined in claim 4 and incorporating a flood lighting source arranged above said scanning window for bias lighting the interior of said mirror tunnel assembly.

13. Omnidirectional optomechanical scanning apparatus for scanning bar coded labels, comprising scanning window at which said labels are presented in random orientation, a multiple of fixed mirror elements arranged to form a mirror tunnel assembly at one side of and contiguous to said window, a multifaceted mirror arranged for continuous rotation and located at the end of said mirror tunnel assembly remote from said scanning window, a photosensitive device arranged with respect to said multifaceted mirror, said mirror tunnel assembly and said scanning window for receiving light from a scanning pattern comprising a multiple of crossed-scanning traces at said window, and a source of light flooding said mirror tunnel assembly.

14. Omnidirectional optomechanical scanning apparatus as defined in claim 13 and wherein said source of light is a Halogen lamp.

* * * * *